Figure 1:
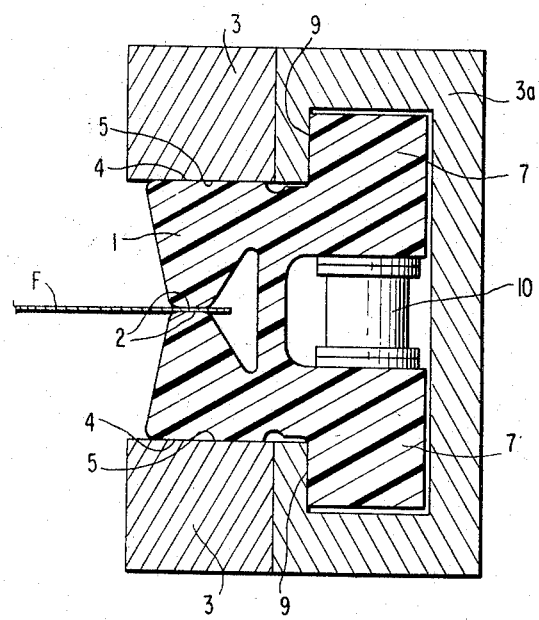

June 6, 1967  G. WIBBING ET AL  3,323,703
CONVEYORS FOR WEBS OF MATERIAL
Filed Dec. 21, 1964

INVENTORS
GERD WIBBING
SIEGFRIED BRUX

BY *James E. Bryan*

ATTORNEY

United States Patent Office 3,323,703
Patented June 6, 1967

3,323,703
CONVEYORS FOR WEBS OF MATERIAL
Gerd Wibbing, Wiesbaden, and Siegfried Brux, Wiesbaden-Biebrich, Germany, assignors to Kalle Aktiengesellschaft, Wiesbaden-Biebrich, Germany, a corporation of Germany
Filed Dec. 21, 1964, Ser. No. 419,915
Claims priority, application Germany, Dec. 31, 1963, K 51,750
6 Claims. (Cl. 226—173)

This invention relates to a device for gripping the edges of webs of plastics films and/or textiles and to conveyors including such a device.

In the manufacture and processing of plastics films or textiles it is necessary for a web of the plastics film or textile material to be gripped at the edges by gripping devices and transported in a predetermined manner. The gripping devices generally used hitherto in both plastics film and textile manufacture have been the stenter clips used in the textile industry for stentering web material. Such clips have certain drawbacks. One such drawback is that the edges of the material cannot be gripped over their whole length, that is to say, there are between the single clips areas of material that are not gripped. Another drawback is that when direction has to be changed during treatment, the clips cannot negotiate the point of deviation from the original path in an even and continuous manner because of their limited gripping length, which is of the order of a few centimetres, the change having to take place stepwise, clip by clip.

It has also been proposed to use an endless conveyor made of flexible, elastic material to grip the edges of plastics films instead of clips. The conveyor comprised two endless belts or one endless belt folded double, thus providing opposed gripping surfaces between which the edges of the film were disposed. The conveyor belts were conducted between rails or some other guiding means which brought them together and the edge of the film was gripped between the two gripping surfaces. However, this gripping device was not capable of holding the edge of the film with an adequate degree of security so that it failed when forces were exerted on the film that sought to withdraw it from the conveyor.

The present invention provides a device for gripping the edges of webs of plastics films or textiles, comprising an endless conveyor means made of flexible material, said conveyor means having opposed gripping surfaces between which the web can be held and opposed guide surfaces upon which pressure can be exerted by guide means to close the gripping surfaces on the web, the guide surfaces being wider than the gripping surfaces so that pressure exerted on the guide surfaces is concentrated on the gripping surfaces. By means of this gripping device, the web can be held more securely.

The invention also provides a conveyor including such a gripping device.

Figure 3:
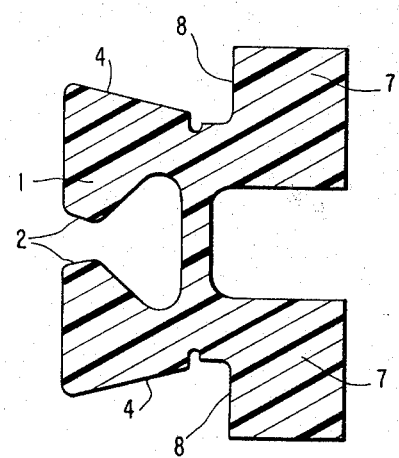
Figure 2:
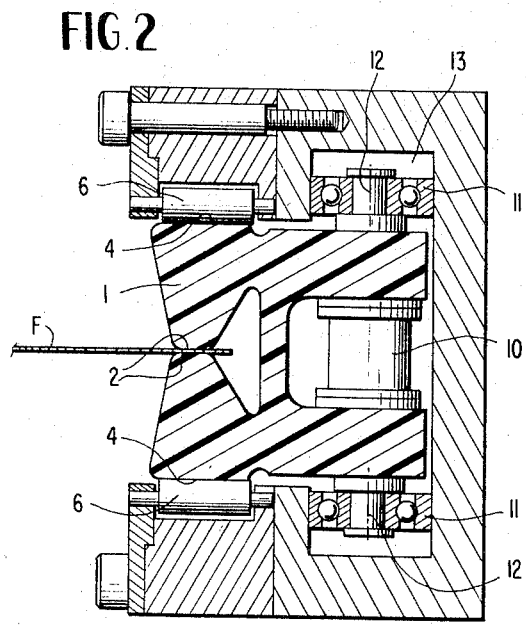

The invention is illustrated by way of example in the accompanying drawing in which:

FIG. 1 is a transverse section of one embodiment of conveyor including a gripping device according to the invention, FIG. 2 is a similar view of a second embodiment of conveyor and FIG. 3 is a similar view of the flexible portion of the gripping device of the conveyor of FIG. 1.

Referring to the drawing, the conveyor shown in FIG. 1 is of especially advantageous design. Its gripping device 1 includes an endless belt made of flexible material, for example polytetrafluorethylene or chloroprene-styrene copolymer. The belt 1 is provided with a pair of jaws that form two opposing gripping surfaces 2. The jaws close when the belt 1 is conducted between guide elements 3 by which the belt is compressed in the desired manner. Opposed guide surfaces 4 of the belt 1, which are shown in contact with guide surfaces 5 of the guide elements 3 when the conveyor is in motion, are disposed relatively to the gripping surfaces 2.

In order to reduce friction at the guide surfaces 4, it is preferable to incorporate guide rollers 6 in the guide means, as in FIG. 2.

In order to transport the belt 1, it may be provided with roller elements such as roller chains which, like the belt itself may also be endless. When a film F has to undergo longitudinal stretching during processing, the belt 1 also has to be extended longitudinally, in which case it is not possible to use a roller chain. In such cases, single rollers may be incorporated in the belt. The corresponding elements appearing in section in FIGS. 1 and 2 are both shown at 10. The belt is driven by gear wheels which engage the roller chain or single rollers 10.

When films are transported in the manner concerned, forces are often exerted which result in a pull towards the centre line of the film web. In order to render the belt capable of withstanding this pull, it may, as shown in FIG. 3, be provided with portions 7 which, as shown in FIG. 1, are in contact with the surfaces 9 of portions 3a of the guide means 3, which portions are disposed perpendicularly to the film in the direction of travel thereof. In the embodiment shown in FIG. 2, the portions 7 and the belt 1 form a single unit made from the same material. Each portion 7 has a sliding surface 8 which is perpendicular to the film surface and which is in contact with the sliding surface 9 on the guide unit 3a in order to take up the lateral pull. When considerable lateral forces are exerted it is advantageous to provide the belt with rollers 11 whose axes 12 are perpendicular to the longitudinal direction of the belt and which run in rails 13, the running surface of which is perpendicular to the plane of the film web to be gripped. The said rollers 11 ensure that the lateral pull is taken up with the minimum amount of friction.

It will be obvious to those skilled in the art that many modifications may be made within the scope of the present invention without departing from the spirit thereof, and the invention includes all such modifications.

What is claimed is:

1. An apparatus for gripping the edges of webs comprising an endless conveyor means made of flexible material, the conveyor means having opposed gripping surfaces between which the web can be held and opposed guide surfaces, and guide means in contact with the guide surfaces whereby the gripping surfaces are closed on the web, the guide surfaces being wider than the gripping surfaces so that pressure exerted on the guide surfaces is concentrated on the gripping surfaces.

2. An apparatus according to claim 1 including roller elements for driving the conveyor means.

3. An apparatus according to claim 1 including an endless roller chain for driving the conveyor means.

4. An apparatus according to claim 1 in which the conveyor means includes additional guide surfaces perpendicular to the plane of the web.

5. An apparatus according to claim 1 in which the conveyor means includes rollers mounted on axes perpendicular to the plane of the web, which rollers function as additional guide means.

6. An apparatus according to claim 1 in which the guide means include rollers in contact with the guide surfaces.

References Cited

UNITED STATES PATENTS

| 2,857,158 | 10/1958 | Ungerer | 226—172 |
| 2,899,201 | 8/1959 | Pirot | 226—172 X |
| 3,106,325 | 10/1963 | Kitching | 226—171 |
| 3,120,892 | 2/1964 | Henning | 198—179 |

M. HENSON WOOD, Jr., *Primary Examiner.*

R. A. SCHACHER, *Assistant Examiner.*